United States Patent
Kulkarni

(10) Patent No.: US 6,597,355 B1
(45) Date of Patent: Jul. 22, 2003

(54) AUTOMATIC RECOGNITION AND SUPPRESSION OF COMPLEX INTERACTING HOLES

(75) Inventor: Vinay Kulkarni, Bombay (IN)

(73) Assignee: Geometric Software Solutions Co. Limited, Mumbai (IN)

( * ) Notice: Subject to any disclaimer, the term of this patent is extended or adjusted under 35 U.S.C. 154(b) by 360 days.

(21) Appl. No.: 09/676,471

(22) Filed: Oct. 2, 2000

Related U.S. Application Data

(60) Provisional application No. 60/156,970, filed on Oct. 1, 1999.

(51) Int. Cl.[7] .............................................. G06T 17/00
(52) U.S. Cl. .......................................... 345/420; 703/1
(58) Field of Search ............................. 345/420; 703/1, 703/2

(56) References Cited

U.S. PATENT DOCUMENTS

| | | | |
|---|---|---|---|
| 4,937,768 A | * 6/1990 | Carver et al. ................... | 703/1 |
| 5,101,363 A | * 3/1992 | Rutkowski ..................... | 703/7 |
| 5,781,194 A | * 7/1998 | Ponomarev et al. ......... | 345/424 |
| 5,841,441 A | * 11/1998 | Smith .......................... | 345/587 |
| 5,977,987 A | * 11/1999 | Duluk, Jr. .................... | 345/441 |
| 6,392,645 B1 | * 5/2002 | Han et al. .................... | 345/420 |

OTHER PUBLICATIONS

Article "A feature recognition algorithm for multiply connected depressions and protrusions in 2½ D objects" by J. Corney and D. E. R. Clark, ACM Press New York, NY, USA pp.: 171–183 Year of Publication: 1991 ISBN:0–89791–427–9.*

* cited by examiner

Primary Examiner—Mark Zimmerman
Assistant Examiner—Enrique L. Santiago
(74) Attorney, Agent, or Firm—Larson & Taylor, PLC

(57) ABSTRACT

A method of recognizing holes and hole chains in a solid model of a part and suppressing at least some of these holes and hole chains in the solid model. In general, the method analyzes each face of a solid model to determine if it is a closed periodic face and, if so, it determines the partner faces of each of the two external loops of the closed periodic face. The closed periodic face is considered to be the shell of a hole and the partner faces are considered to be the end faces of the hole. Hole chains are recognized by determining holes that share an axis and an end loop and interaction of these hole chains is recognized by determining hole chains that share a common loop but have dissimilar axes. Suppression of the suppressible holes is completed by providing to the geometric kernel listings of interacting hole chains for deletion.

10 Claims, 10 Drawing Sheets

AUTOMATIC RECOGNITION AND SUPPRESSION OF COMPLEX INTERACTING HOLES

The present application claims priority of U.S. provisional application Ser. No. 60/156,970, filed Oct. 1, 1999, which is incorporated herein by reference. The present application further incorporates by reference the subject matter of U.S. application Ser. No. 09/397,104, filed Sep. 16, 1999, which application is owned by the same entity as the present application.

FIELD OF THE INVENTION

The invention relates generally to three-dimensional solid modeling and more particularly to a system for recognizing holes in a solid model.

BACKGROUND OF THE INVENTION

Solid Modeling

Solid modeling is a term that refers to a set of techniques that can be used to create and store computer based representations of physical objects. A number of techniques have evolved over the years for providing computer-based representations of three-dimensional parts. One of these techniques is Boundary Representation (B-rep).

A Boundary Representation (B-rep) model of a mechanical part consists of a set of "faces," "edges" and "vertices," which are connected together to form a topological structure of the part. By using such a representation, it is possible to evaluate many properties of the part from its computer model. These include the mass, the volume, the moments of inertia and. products of inertia. Additionally, such models enable computer-based analysis of stress and strains in the part under different loading conditions. B-rep based computer models can also be "cut" and examined in a manner similar to an actual part. For these reasons, a B-rep model of a part is known as a "solid" model. Other representations of solid models are also known in the art.

Software based on solid modeling is widely used by engineers to create models of parts that eventually have to be manufactured. Software such as SolidWorks™ (SolidWorks Inc.), Pro/Engineer™ (Parametric Technology), I-DEAS™ (Structural Dynamics Research Corp.) and Mechanical Desktop™ (AutoDesk) are examples of solid modeling software.

Importance of Holes

Holes invariably exist in almost all engineering parts and perform many important functions. Some of these functions are as follows: holes may be used to bolt or screw the parts together in an assembly; they may be used as oil holes through which oil or lubricant flows into machine interiors, or they may provide a conduit through which other liquid or gas passes. In many parts, holes constitute a significant percentage of features present in the part. FIG. 1 illustrates a part with complex and interacting holes.

Holes are of interest to engineers during all stages of the design-to-manufacturing cycle. While editing a part model, designers may be interested in modifying hole parameters such as diameter and depth. In the analysis stage, an engineer may prefer to ignore some holes since they are not expected to contribute significantly to stresses and strains in the part. During manufacturing, planning holes governs the selection of some of the manufacturing processes, the machine tools and the cutting tools and even the material from which a part will be made. Moreover, information such as hole type, hole axis, and hole parameters can govern the exact manufacturing sequence and the selection of machining parameters.

In the absence of explicit hole information, it is difficult and cumbersome to modify part models and generate the information that is needed for manufacturing. If information related to holes can be deduced automatically from a computer based representation (model) of the part, many tasks of the design-to-manufacturing cycle can be simplified, or even automated.

Solid modeling software provides many methods for creating the models and design engineers may use a combination of such methods for modeling holes. For example, holes may be modeled using at least the following two distinct techniques:
1. Define a cross section and extrude it along a line segment, with a negative volume attribute, to create a hole. This method is illustrated in FIG. 2.
2. Define a cross section and revolve it about a line segment, with a negative volume attribute, to create a hole. This method is illustrated in FIG. 3.

Due to the existence of multiple modeling methods, solid modeling systems do not guarantee that hole information will be easily and explicitly available to engineers in a form that can be used to automate tasks of the design-to-manufacture processes. This is a major hurdle in achieving the goal of automating most tasks of the design-to-manufacture cycle.

This invention addresses this problem and provides means of automatically recognizing hole information from B-rep solid models and also provides tools for selectively deleting the recognized holes.

SUMMARY OF THE INVENTION

The invention is a method implemented by a computer program, and a computer running the same, for recognizing complex holes in solid models—irrespective of their creation method. In addition to recognizing individual holes, a method according to the invention can also recognize a sequence of connected holes (a chain), detect interactions between hole chains, and delete the holes—if required. The invention comprises several software modules which operate on boundary representation solid models and which run on a computer. The modules may be implemented in any programming language, such as C or C++, and may use local operators from known geometric modeling kernels.

A hole recognition software module receives a boundary representation from, for example, one of the solid modeling programs mentioned above or any other source capable of providing a standardized data structure for describing solids. The module identifies all closed surfaces (e.g., conical, torroidal, or cylindrical faces) and maps any holes interconnected by those faces. More specifically, each face of the boundary representation data is traversed, and any faces that include known closed surfaces, are noted. Since the axis of each closed face is known (derived from the boundary representation data structures), adjacent faces are also examined for other closed surfaces along the same axis. By propagating along an axis in both directions, hole chains can be identified. Each hole can then be characterized according to its axis, radius, diameter and other relevant information. This information is in turn stored as a separate data structure in addition to the original boundary representation. After hole chains are identified, it is also possible to identify interactions between such hole chains. Two hole chains interact if a hole belonging to one chain opens into a hole belonging to another chain. Such hole interaction information is also generated and stored as a separate data structure in addition to the original boundary representation.

Advantageously, a hole modification software module permits manipulation of the recognized holes and hole chains. This module uses the hole chain and hole chain interaction information and facilitates complete deletion of sets of interacting hole chains. Deletion of interacting hole chains results in a simple outside boundary surface map of the original structure. These hole modifications can then be used to create a new boundary representation containing any changes to the original structure, or any temporary modifications such as hole suppression. FIG. 4 shows a solid model that is obtained after suppressing holes in the solid model shown in FIG. 1.

The hole recognition and suppression results from the present invention have a wide range of useful applications. For example, hole data may be used to automatically generate instructions for drilling holes, to selectively delete holes to simplify finite element analysis or to greatly simplify operations such as hole movement or hole resizing.

DETAILED DESCRIPTION OF THE PREFERRED EMBODIMENTS

Other features and advantages of the invention will be set forth in, or apparent from, the detailed description of the preferred embodiments of the invention which is found hereinbelow. In the figures, like elements are represented by like numerals throughout the several views.

Hole Identification

This section sets forth the steps that are involved in the identification of holes from B-rep solid models. An important property of holes is that they necessarily consist of surfaces that are mathematically classified as 'periodic' and, for example, include cylindrical surfaces, conical surfaces, and toroidal surfaces. B-rep models may represent surface information either explicitly or implicitly. Explicit representations directly maintain information about the type of the represented surface. For example: cylindrical surface. Implicit representations maintain surface information in a generic manner. The surface type is not explicitly captured in such representations, but has to be derived from the generic representations. An accepted generic representation scheme for curves and surfaces is the 'Non-Uniform Rational B-Splines' (NURBS) scheme. In the context of this invention, the task of deducing the surface type by processing NURBS information is known as 'geometry simplification'.

Figure 5:
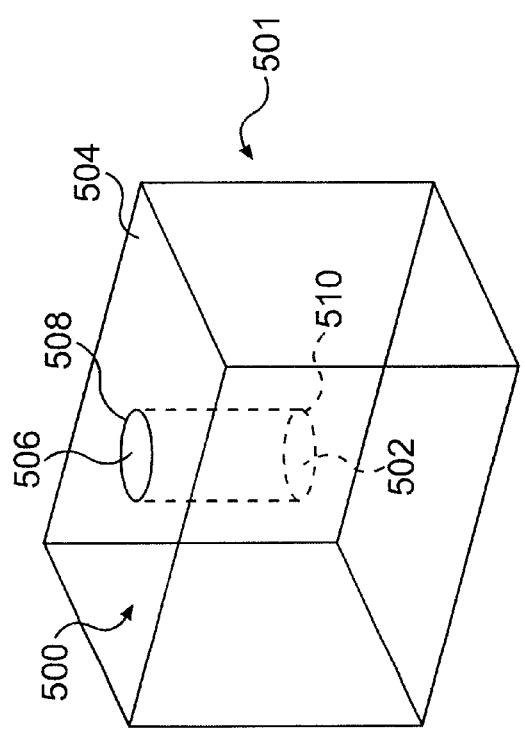
FIG. 5 shows a representation of a second sample part having a single hole therein with the components of the hole labeled in accordance with the present invention.

An "atomic hole" consists of 'shell' and 'end' faces. Faces that constitute the sidewalls of an atomic hole are termed 'shell' faces while faces that constitute the bottom and top of an atomic hole are termed 'end' faces. Further, faces of the part that completely belong to the hole are known as 'created' faces; whereas end faces where holes open out into the part are known as 'shared' faces, as the face both forms the hole opening and serves as another surface of the part. An example of a part with an "atomic" hole therein is shown in FIG. 5, wherein the various types of hole components are labeled. The components forming hole 500 in part 501 are a created end face 502 at the hole's lower end, a shared face 504 forming the hole's upper end and a shell face 506 forming the sides of the hole.

Every atomic hole is considered to have two ends and each end consists of a sequence of edges connected end-to-end. Such a sequence of edges is termed a 'loop.' Every atomic hole therefore has two end loops, one corresponding to each of its ends. Some geometric kernels do not represent closed periodic faces as a single face with two loops, but represents them either as two split faces or as, for example, a cylindrical face with a longitudinal seam. In the present invention, the loops at the two ends are internally created and the representation is converted to a form where the periodic face has two loops. Points can be derived at many positions on these loops. In FIG. 5, where the upper end loop is labeled 508 and the lower end loop is labeled 510, the lower end loop 510 is a concave loop because the constituent edges are on the periphery of end face 502, while upper end loop 508 is convex because its constituent edges are internal to end face 504. The concave and convex loop descriptors are appropriate for holes but would be exactly the reverse for bosses, for example.

Figure 6:
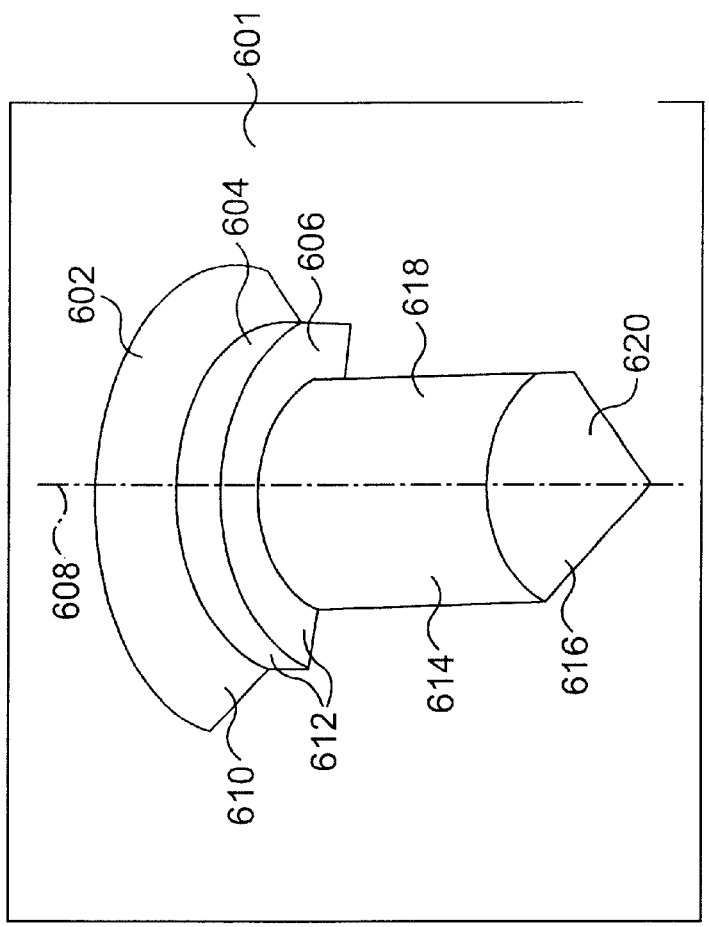
FIG. 6 shows a representation of a third sample part having a chain of holes therein with the components of the holes labeled in accordance with the present invention.

An atomic hole may have either a 'created' or 'shared' end face adjacent to its shell face, or it may have the shell face of another atomic hole adjacent to its shell face. With reference to part 601 in FIG. 6, the end of the shell face 602 of the first hole 610 has the shell face 604 of the second hole 612 adjacent thereto, whereas in the case of the second hole, its shell face 604 has its own end face 606 adjacent thereto.

Figure 7A:
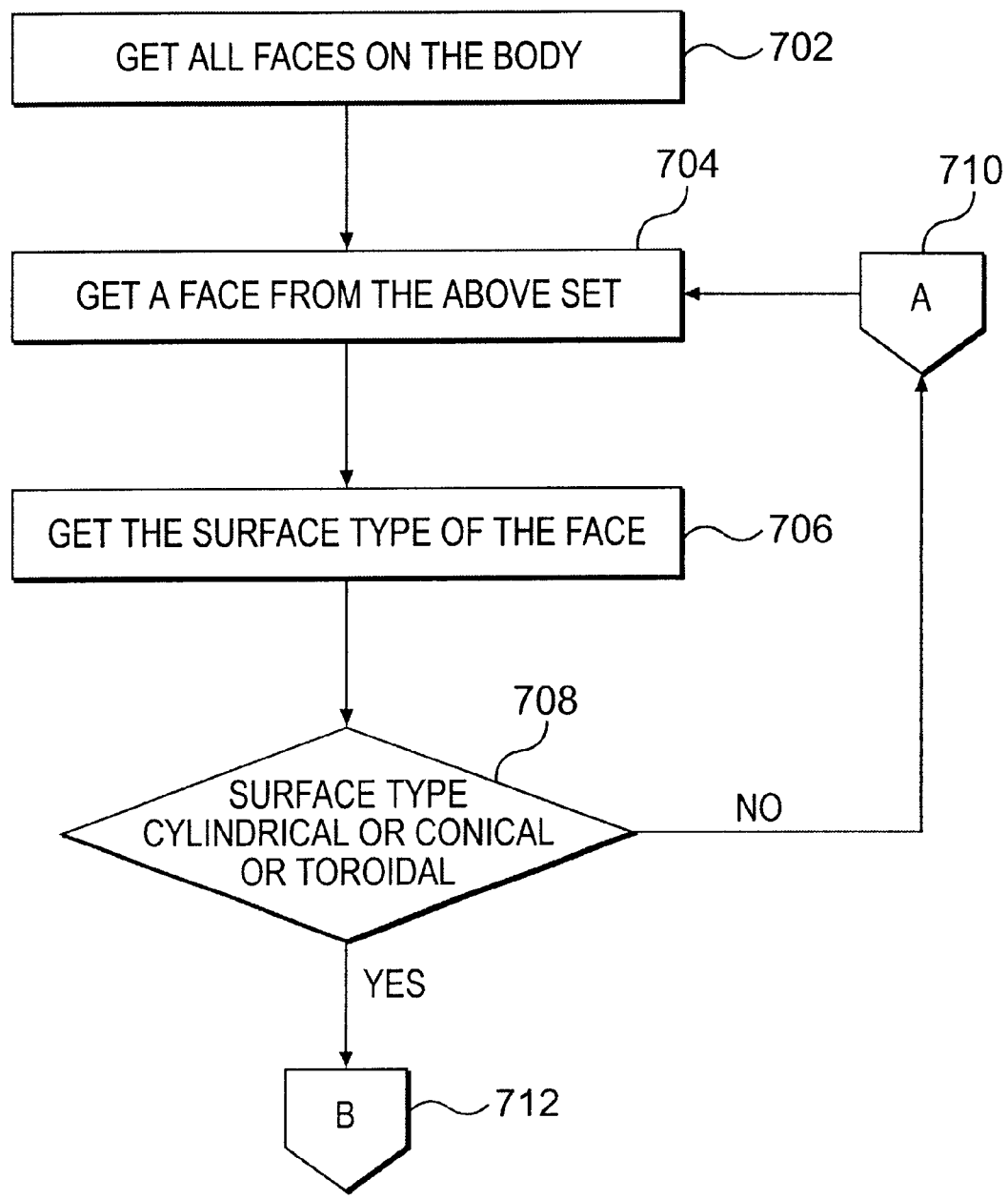
FIGS. 7a and b are flowcharts showing the process for recognizing atomic holes from solid models.

As shown in the flowchart of FIG. 7a, the hole identification process of the present invention begins by creating a list of all faces (surfaces) existing in the B-rep solid model of the part (steps 702, 704). The periodic faces are then identified and stored as a subset of all faces (steps 706 and 708). Geometry simplification is performed if required to identify the periodic faces.

Figure 7B:
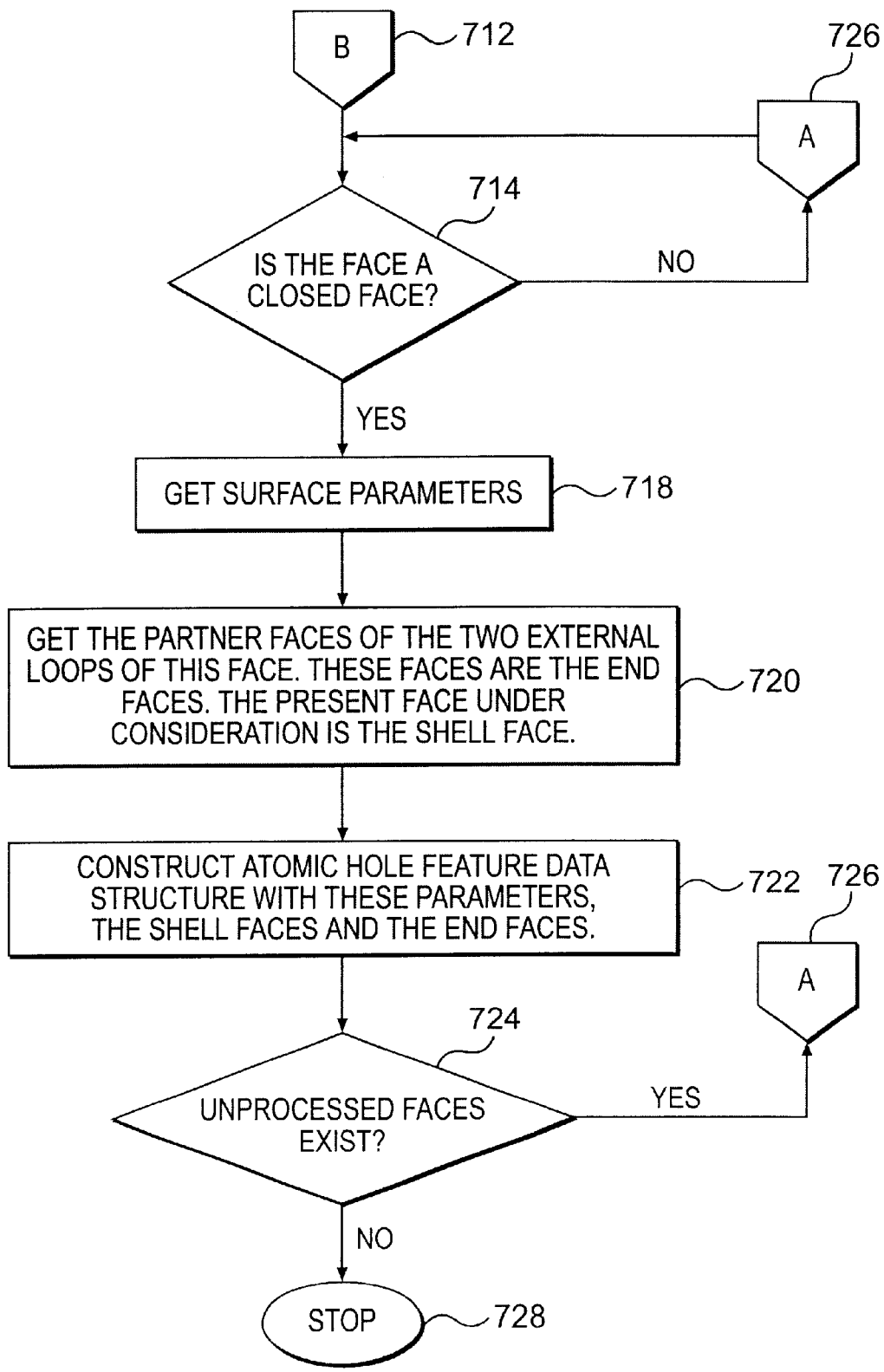

For all periodic faces, an additional check is then performed to identify if the faces are closed, as shown in FIG. 7b. If a face is a 'closed periodic face', it is marked as a candidate "atomic hole" (step 714), and the surface parameters are obtained for the face (step 718). Next, the partner faces of the two external loops of the face are obtained and marked as the end faces of the hole, while the present face is marked as the shell face (step 720). The atomic hole feature data structure is then constructed with the end faces, the shell face and the surface parameters (step 722). This process is repeated until all identified faces have been processed and stored (steps 724 and 726). A list of shell faces and a list of end faces is created for each atomic hole.

In the present method the following parameters are automatically calculated and stored for every confirmed atomic hole.

1. The type of the hole's surface. Based on the type of the shell face, an atomic hole is classified into one of the following: cylindrical type, conical type, and torroidal type.

2. The volume type of the feature. For holes, this parameter takes the value 'depression.'
3. The radius of the atomic hole.
4. The axis of the atomic hole.
5. The position of the atomic hole. This parameter refers to a point on the axis of the hole.
6. A set of control points corresponding to the first end of the atomic hole.
7. A set of control points corresponding to the second end of the atomic hole.
8. The extent of the atomic hole along the axis.

In a preferred embodiment of the present method, after all atomic holes present in the part are identified, a process of detecting connected atomic holes and identifying hole chains begins.

Chain Identification

Figure 8:
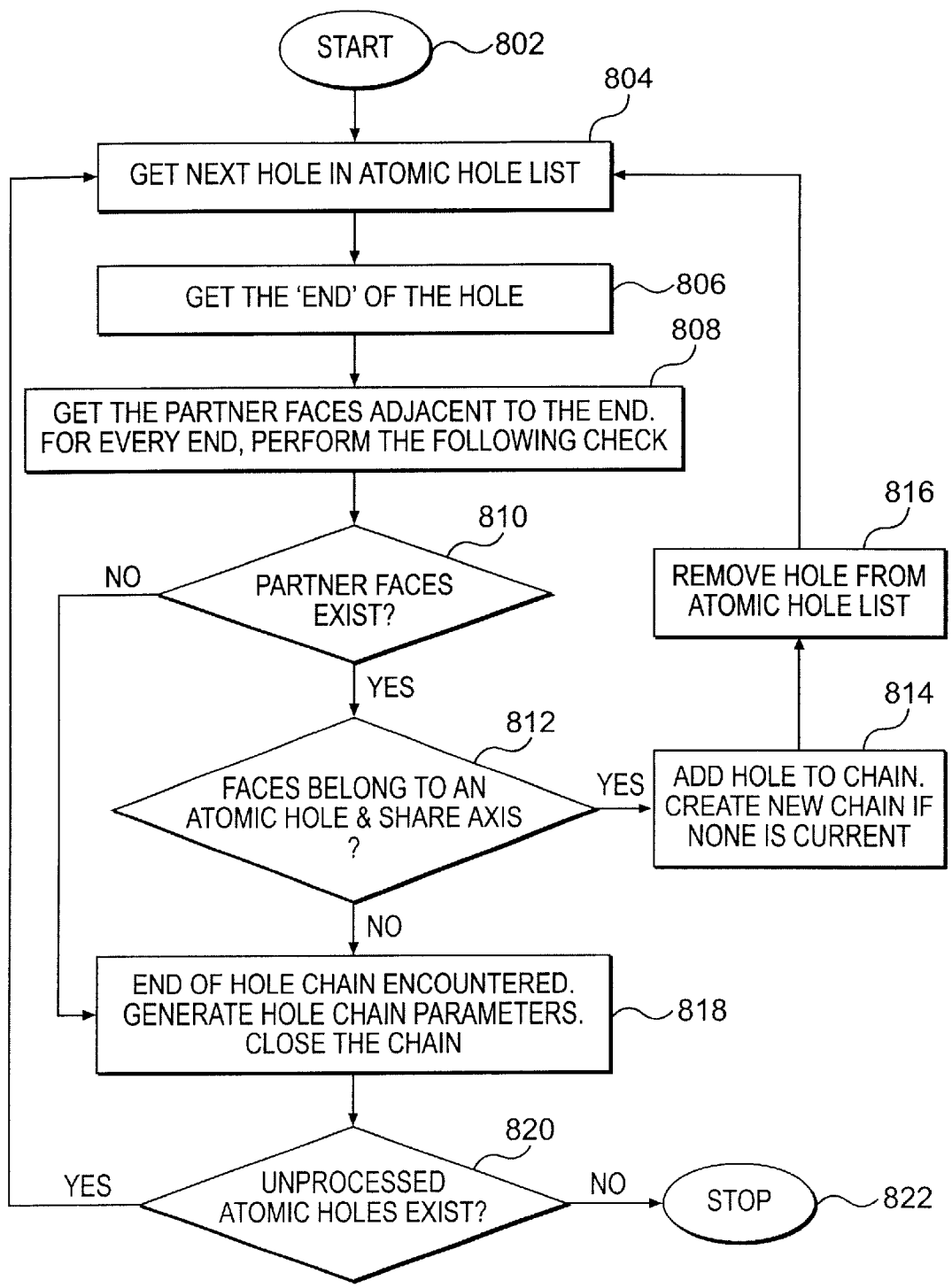
FIG. 8 is a flowchart showing the process for generating hole chains from recognized atomic holes.

The flowchart in FIG. 8 shows the steps involved in creating hole chains using the generated atomic hole information. This process takes the holes from the hole list one at a time and analyzes each hole with respect to the last hole processed. First, the set of 'adjacent' or 'partner' faces is identified for every atomic hole and the set of 'adjacent' faces is identified for each of its ends. 'Partner' or 'adjacent' faces are faces that are not part of the current hole but that share the end of the current hole with the current hole. Checks are performed to see if the adjacent faces belong to other another atomic hole. If they do, and if the two holes share a common axis, the current atomic hole and its adjacent atomic hole are termed as 'chained' and the data structures for a new chain are instantiated. This process of identifying an adjacent atomic hole and including it in the hole chain is termed 'propagation'. The propagation process continues recursively, at both ends, until no more adjacent atomic holes are found.

The propagation process begins by obtaining the next hole from the hole list (step 804) and then obtaining the 'end' of the hole (step 806) and the partner faces adjacent to the end (step 808). A check is then performed by first determining whether a partner face exists (step 810). If no partner face exists, the method determines that the end of the hole chain has been encountered and the hole chain parameters are generated (step 818). If a partner face does exist, the method determines if the face belongs to another atomic hole that shares an axis with the current hole (step 812). If yes, the current hole is added to the current chain or, if there is no current chain, a new one is created (step 814), and the current hole is removed from the atomic hole list (step 816). This process is repeated until the end of the hole chain is encountered (step 818), that is, until no partner faces exist that belong to another atomic hole that shares the same axis as the current atomic hole. At that point, the chain is closed (step 818).

Returning to FIG. 6, shell face 602 belongs to first hole 610 and shell face 604 and end face 606 belong to second hole 612. End face 606 and shell face 618 belong to third hole 614 and face 620 belongs to fourth hole 616. All four atomic holes share axis 608 and are part of one chain.

The hole chain identification is repeated until all the recognized atomic holes are processed and assigned to some chain. At the conclusion of this stage, data structures corresponding to a set of hole chains are created in the system and every recognized atomic hole belongs to one and only one hole chain.

Figure 1:
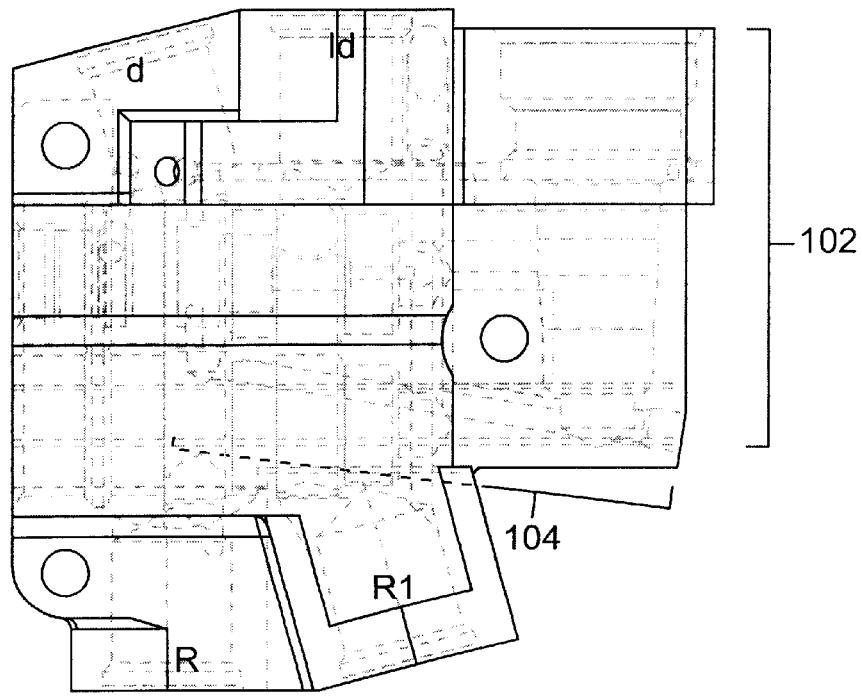
FIG. 1 shows a representation of a sample part having a complex arrangement of holes therein.
Figure 4:
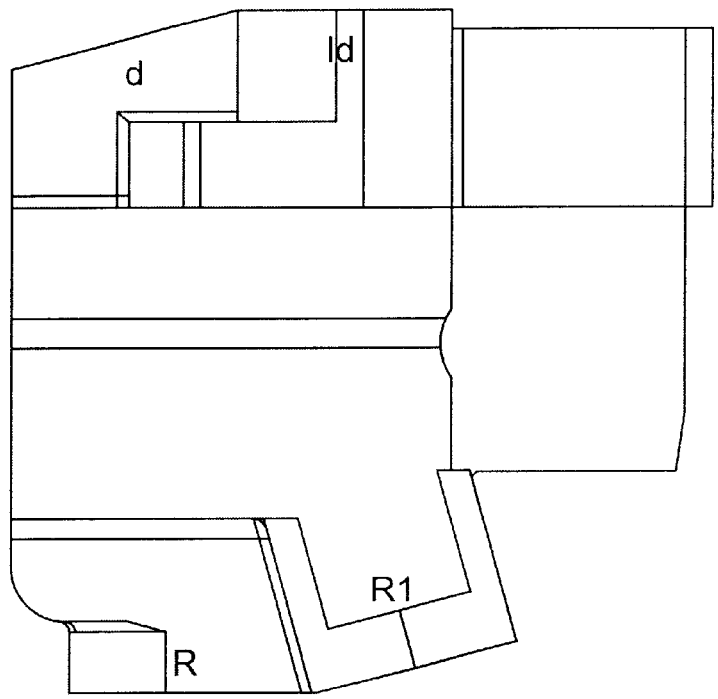
FIG. 4 shows a representation of the sample part of FIG. 1 after suppression of the holes therein.
Figure 2C:
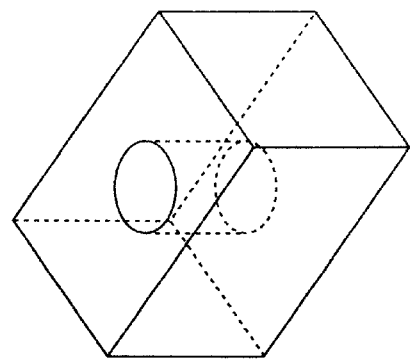
FIGS. 2a–2c illustrate one prior art method of hole creation in a model of a part.
Figure 2B:
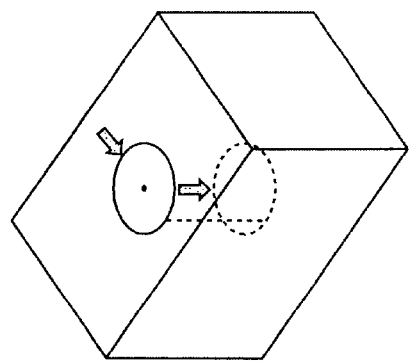
Figure 2A:
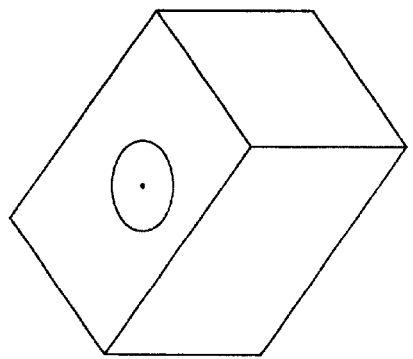
Figure 3B:
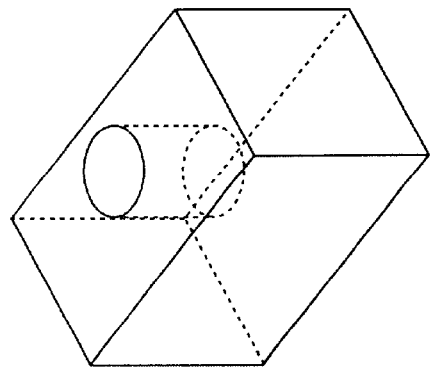
FIGS. 3a–3b illustrate a second prior art method of hole creation in a model of a part.
Figure 3A:
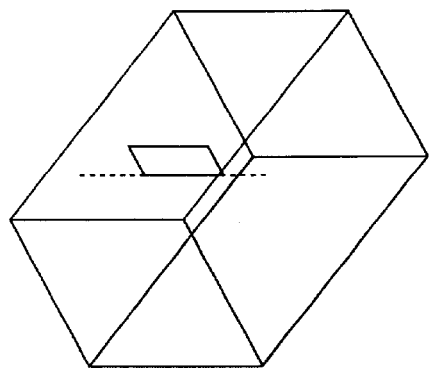

For every identified hole chain the following set of parameters are calculated and stored:
1. Reference position for the hole chain
2. Hole chain axis
3. Extents of the chain along the axis
4. Set of points on either ends of the chain
5. Radius of the largest hole in the hole chain
6. Radius of the smallest hole in the hole chain
7. Volume type—set to 'DEPRESSION' for hole chains Interaction Identification Hole chains may interact with each other as illustrated in FIG. 1. The present invention is capable of identifying all such hole chain interactions. One hole chain interaction is shown in FIG. 1 where chain 102 interacts with chain 104.

Figure 9A:
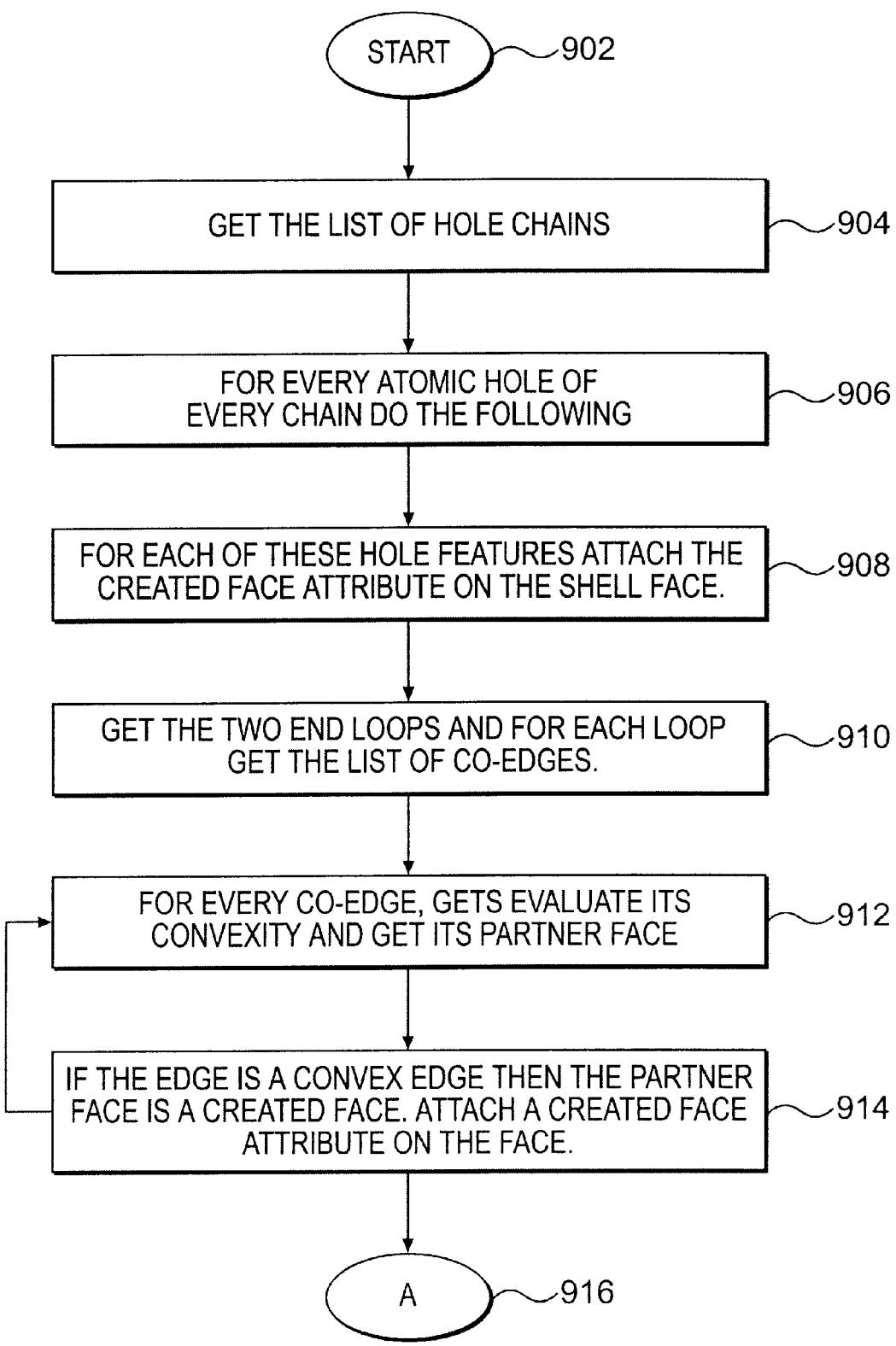
FIGS. 9a–9c are flowcharts showing the processes for generating information regarding hole chain interaction.
Figure 9B:
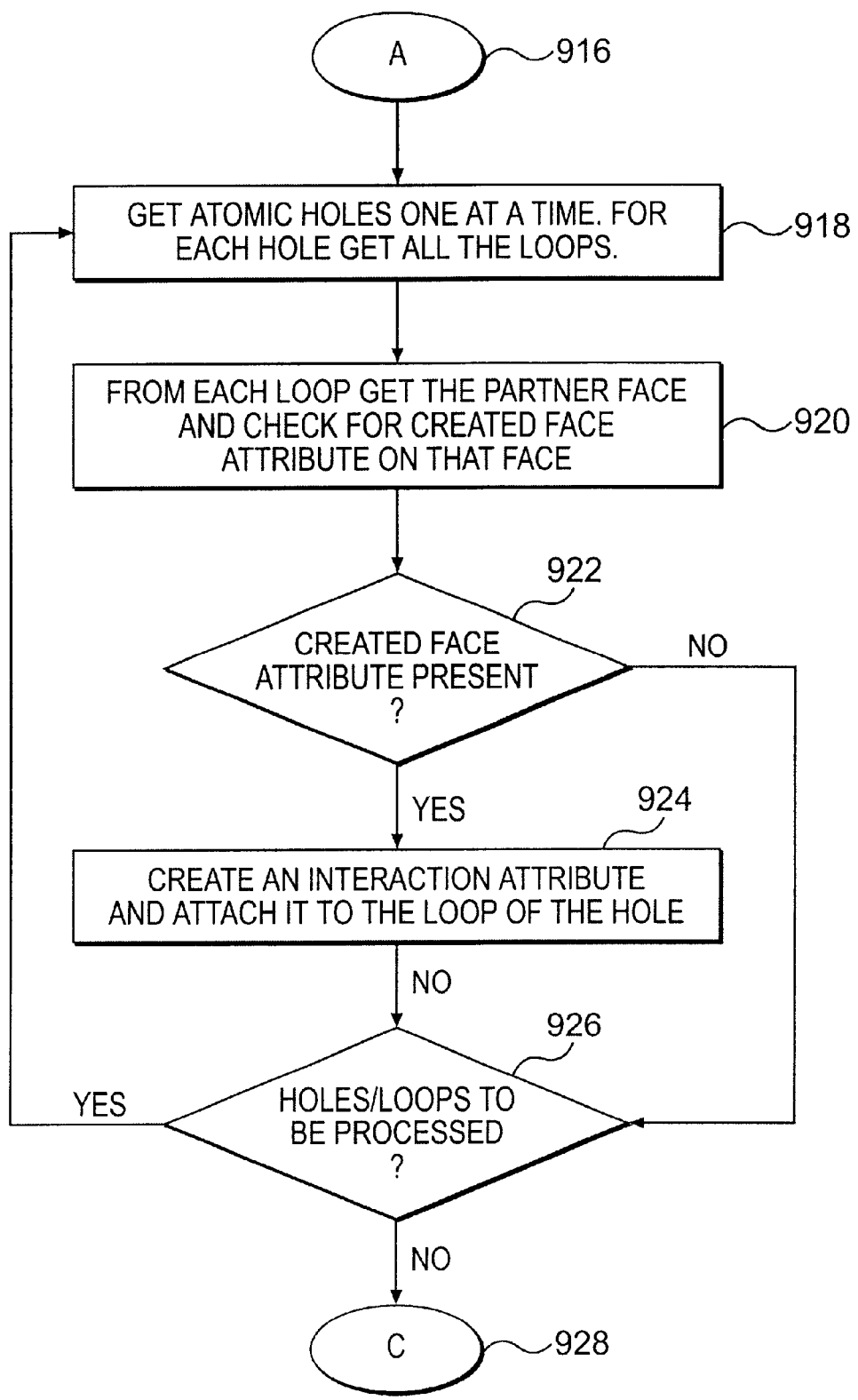
Figure 9C:
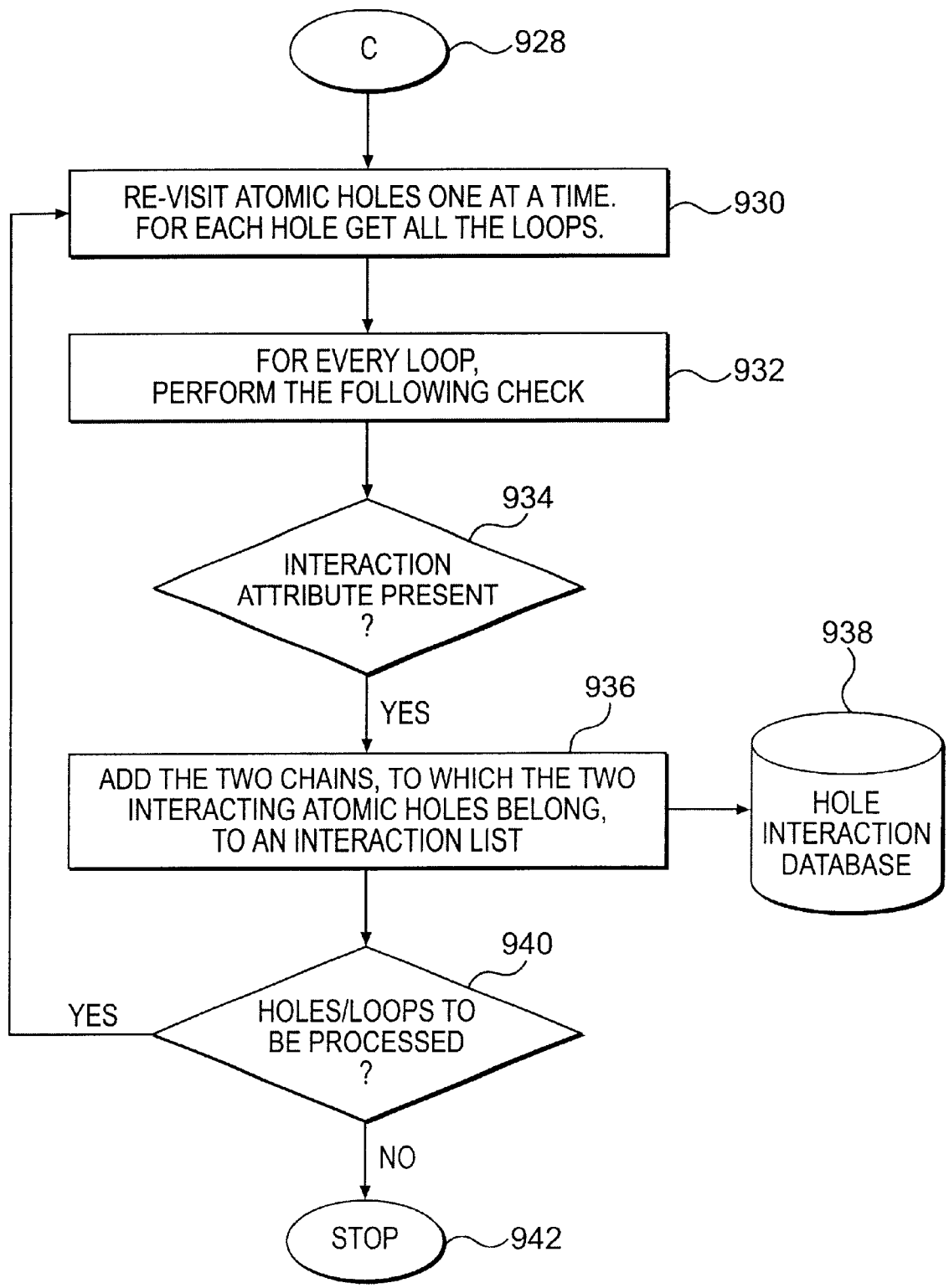

Processing the hole chain and the atomic hole data structures generates information about interactions between chains. FIGS. 9*a* through 9*c* set forth the steps involved in identifying the interactions between hole chains and generating hole interaction information. Steps 904 and 906 initialize the process by obtaining the list of hole chains from storage and subjecting each atomic hole of each chain to the analysis beginning with step 908. Step 908 involves attaching an attribute onto the shell face of the current atomic hole, indicating that the face is a 'created' face. In step 910, the loops at the two end faces of the current atomic hole and the list of constituent edges of those loops are obtained. The constituent edges of each end loop are analyzed in step 912 to see if they make up a 'convex' loop or a 'concave' loop. In FIG. 5, the lower end loop 510 is a concave loop because the constituent edges are on the periphery of end face 502, while upper end loop 508 is convex because its constituent edges are internal to end face 504. If a loop is concave, then the faces that are adjacent, through this loop, to the atomic hole under consideration, are obtained and a 'created' face attribute is attached onto them (step 914). This has the effect of classifying the 'end' faces of a blind hole as 'created'.

The above steps complete the pre-processing that is required to begin the identification of interactions among hole chains. The next stage involves visiting the attributed hole faces to detect hole interactions. This is done in the following way.

In a B-rep model, the faces have at least one external loop and possibly many internal loops. Closed periodic faces such as cylinders have two external loops and possibly many internal loops. An atomic hole, and thus the chain to which it belongs, interacts with other hole chains through the loops on its shell and end faces.

In the chain interaction identification stage, therefore, all the atomic holes are processed and the created shell and end faces of the atomic holes are identified (through the attributes attached onto them in the earlier processes). For every such face, which is termed as the 'parent' face, a list of loops is generated (step 918 in FIG. 9*b*). For every such loop the 'adjacent' faces are obtained and checked to determine if they have the 'created' face attribute attached thereto (step 920). If such an attribute is found (step 924), and if the holes do not share the same axis, it implies that the hole chain, of which the 'adjacent' face is a constituent, interacts with the hole chain of which the 'parent' face is a constituent. When such an interaction is found, an 'interaction attribute' is created and attached to the loop that is the boundary between the two chains, as shown in step 924. All the loops of all the holes are processed in this manner, as shown through decision step 926.

After all the atomic holes are processed in this manner, a second pass of the algorithm re-visits the loops of the atomic holes (steps 930–32). In this pass, the system gets the interaction attribute, if any, attached to the loop (step 934) and builds a data structure that represents and contains information about interactions between interacting hole chains (steps 936–38) and the process is repeated until all holes and loops have been processed. This data structure contains the following information.
1. Number of hole chain interactions
2. Number of hole chains involved in each such interaction
3. Identity of the hole chains participating in such interactions A preferred embodiment of the present invention provides a method for suppressing holes recognized in a solid model. The hole interaction information obtained by the above method is useful in suppressing the recognized holes.

Suppression of Hole Chains

It may be required to suppress holes in a part model for the following reasons:
1. To simplify the part model while making modifications to it.
2. To remove insignificant holes, from the point of view of analysis, prior to analysis.
3. In the context of automatic feature recognition, to remove holes and facilitate the recognition of other features present on the part.

Suppression of holes from a solid model of a part is a complex operation and requires the use of 'local operations' facilities provided by the geometric modeling kernels. More specifically, the following facility of geometric kernels is used: deleting a set of given faces from the model and heal the resulting 'wound' by modifying the faces adjacent to the deleted faces. In order for such a local operation to succeed, the kernel has to be supplied with such logical set of faces, the deletion of which does not result in complex wounds that cannot be healed. The hole chain and chain interaction information generated in the previous steps enable the creation and presentation to the kernel of such well-formed list faces to be deleted to the kernel.

Some of the hole chains interact in complex ways. Due to such complex interactions it is not possible to delete either a single atomic hole in a hole chain, or, even just an entire hole chain. The observation is that if the interacting hole chains are identified and the created faces of all atomic holes that form part of these chains are sent to the kernel for suppression, the operation is successful. The hole chain interaction information provides exactly this information. It is used to identify and generate face lists corresponding to created faces of atomic holes that are sent to the kernel for suppression. The following steps are involved in suppressing the recognized holes.

Figure 10:
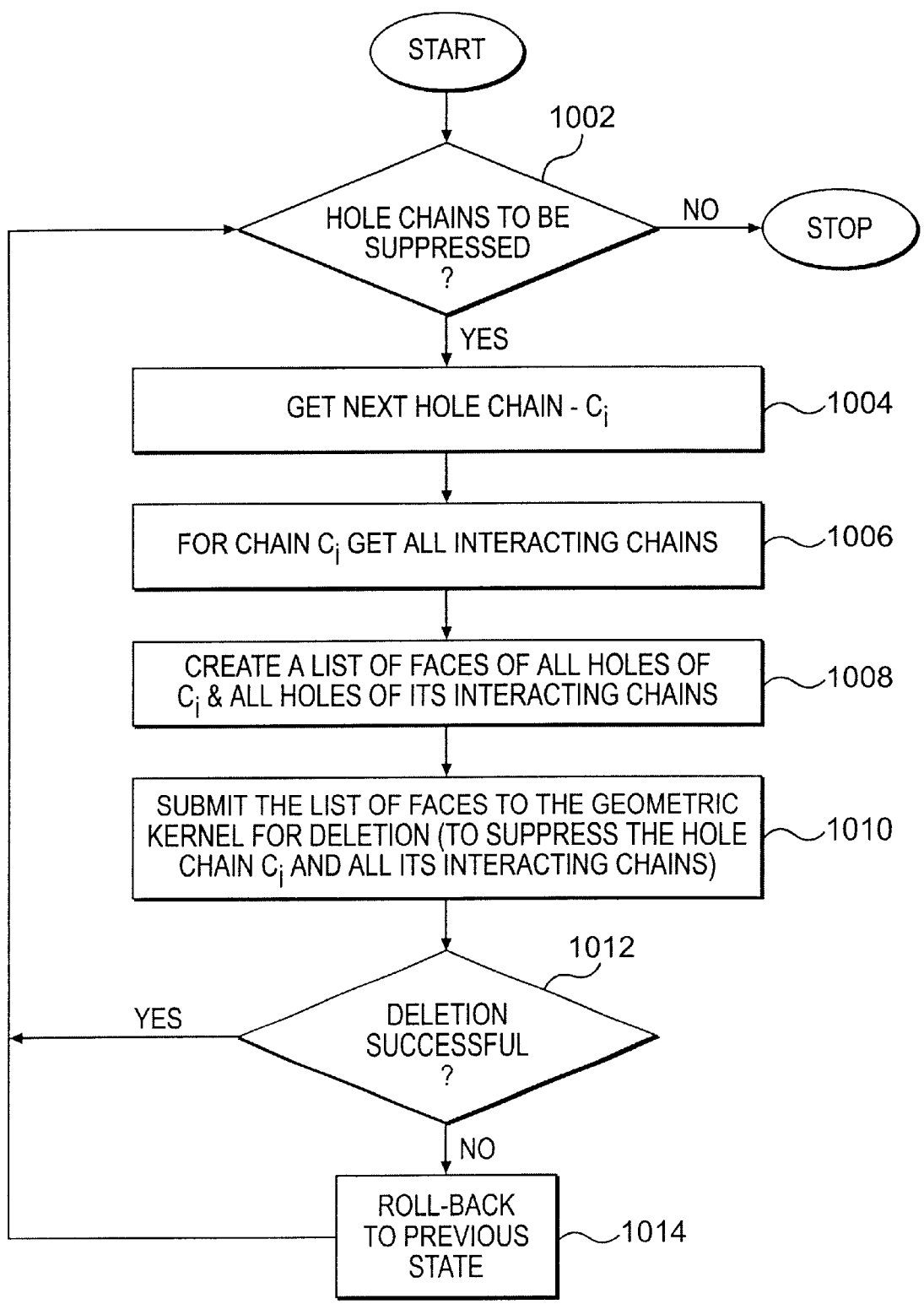
FIG. 10 is a flowchart showing the process for suppressing holes in a solid model.

For every hole chain to be suppressed (such chains are identified by the application that uses this invention), the algorithm performs the following actions, as depicted in the flowchart in FIG. 10. First, a determination is made whether any hole chains exist to be suppressed in step 1002. Next, a subject hole chain in the hole chain list is obtained from the master list in storage of all interacting or chains created above (1004). All chains interacting with the subject hole chain are also obtained from the master list (1006). These are 'dependent' chains that must be suppressed with the subject chain. A 'face' list is created of all the faces of all the holes in the subject hole chain and of all the holes the hole chains dependent on the subject chain in step 1008. This list is then submitted to the geometric kernel for deletion of the listed hole chains, thereby suppressing the subject hole chain and all of its dependent interacting chains in the model (step 1010). The part model is then checked for validity, that is, an inquiry into whether the deletion was successful (step 1012) and, if so, the deleted chains are removed from the master list and the next hole, if any, in the master list is analyzed. If the deletion was not successful, no changes are made and the process is performed on the next hole chain in the master list (step 1014). The process continues until there are no more unprocessed hole chains. The process results in suppression of all of the identified hole chains along with their dependent suppressible hole chains, although not all holes chains may be suppressible.

It is noted that although the embodiment of the present invention described above relates to the recognition and suppression of hole chains, the methods described herein can also be used to recognize and suppress chains of boss features. Although the present invention has been described to specific exemplary embodiments thereof, it will be understood by those skilled in the art that variations and modifications can be effected in these exemplary embodiments without departing from the scope and spirit of the invention.

We claim:

1. A method of recognizing and building a data structure database of at least one atomic hole in a solid model of a part, said method comprising:
    a. generating a list of faces comprising the solid model;
    b. analyzing the surface type of each such face to generate a sublist comprising all periodic faces, including all cylindrical, toroidal and conical faces in the solid model;
    c. analyzing a subject face in said sublist to determine if it is a closed face and, if so, using the surface parameters of said closed face, determining the partner faces of the two external loops of said subject face, labeling said closed face as a shell face of an atomic hole and labeling said partner faces as end faces of said atomic hole; and
    d. constructing an atomic hole feature data structure comprising the surface parameters of said shell face and said end faces.

2. The method of claim 1, wherein steps c and d are repeated for a plurality of faces in said sublist to thereby recognize and build a database of data structures of a plurality of atomic holes in said solid model.

3. The method of claim 2, wherein said steps c and d are repeated for all faces in said sublist to thereby recognize and build a database of data structures of all of said atomic holes in said solid model.

4. The method of claim 3, wherein said data structure for each said atomic hole comprises the type of said atomic hole's surface, the radius of said atomic hole, the axis of said atomic hole, the position of said atomic hole, a set of control points corresponding to each of a first and second end of said atomic hole, and the extent of said atomic hole along its axis.

5. The method of claim 3, further comprising a process for identifying a hole chain in said solid model from said database of data structures comprising:
    a. opening a hole chain;
    b. obtaining a data structure of a subject hole from said database, including parameters defining both end faces of said subject hole;
    c. analyzing both end faces of said subject hole to determine if a partner face exists for either of said end faces;
    d. determining if any of said partners faces belongs to a further atomic hole that shares an axis with said subject hole, if not, jumping to step k;
    e. adding said subject hole to said open hole chain and labeling said subject hole as analyzed;
    f. considering said further atomic hole as the next subject hole and returning to step f; and
    g. closing said hole chain.

6. The method of claim 5, further comprising a process for identifying all hole chains in said solid model comprising repeating steps e through k until all holes in said database have been analyzed and generating a database of identified hole chains for said solid model.

7. A method for identifying hole chain interaction in a solid model in which a plurality of hole chains have been identified and some of said hole chains share a common loop but with dissimilar axes, and in which a database of the chains involved in all such sharing is generated, said method comprising:

a. selecting a current atomic hole;

b. attaching a 'created' face attribute onto the shell face of said current atomic hole;

c. obtain the end loops and list of co-edges therefor for said current atomic hole;

d. determining from said co-edges if any loop of said atomic hole is convex, if not return to step a;

e. obtaining the faces that are adjacent to each said convex loop and attaching a 'created' face attribute thereto;

f. labeling each 'created' shell or end face as a 'parerit' face;

g. generating a list of loops for each parent face and obtaining any adjacent faces having a 'created' face attribute;

h. generating a database of hole chain interactions where ever a parent face and any 'created' adjacent faces belong to holes having different axes; and i. attach an 'interaction attribute' to said convex loop.

8. The method of claim 7, for suppressing a subject hole chain in the solid model, said method comprising:

a. obtaining the subject hole chain and all hole chains interacting therewith from a master list of all hole chains and hole chain interactions in said solid model;

b. creating a 'face list' of all the faces in all the holes of the subject hole chain and all hole chains interacting therewith; and c. submitting said 'face list' to a geometric kernel for deletion of all faces in said 'face list' from said solid model, thereby suppressing all chains comprised of said faces.

9. The method of claim 8, further comprising, determining if said deletion of each face was successful and, if so, removing said deleted chains from said master list.

10. The method of claim 9, further comprising a process for suppressing all suppressible hole chains in a solid model comprising repeating the method until no hole chains remain in said master list.

* * * * *